United States Patent
Hathe et al.

(10) Patent No.: US 10,994,701 B2
(45) Date of Patent: May 4, 2021

(54) INCIDENT CAPTURE SYSTEM FOR PARKED VEHICLES USING AN REAR/MULTI VIEW CAMERA SYSTEM

(71) Applicant: Robert Bosch GmbH, Stuttgart (DE)

(72) Inventors: Sanjeev Kumar Hathe, Novi, MI (US); Samir Patel, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/275,095

(22) Filed: Feb. 13, 2019

(65) Prior Publication Data

US 2020/0207309 A1   Jul. 2, 2020

Related U.S. Application Data

(60) Provisional application No. 62/786,873, filed on Dec. 31, 2018.

(51) Int. Cl.
*B60R 25/30* (2013.01)
*B60R 1/00* (2006.01)
*H04N 5/232* (2006.01)

(52) U.S. Cl.
CPC .............. *B60R 25/305* (2013.01); *B60R 1/00* (2013.01); *B60R 25/302* (2013.01); *H04N 5/23203* (2013.01); *B60R 2300/105* (2013.01)

(58) Field of Classification Search
None
See application file for complete search history.

(56) References Cited

U.S. PATENT DOCUMENTS

| | | |
|---|---|---|
| 6,163,338 A | 12/2000 | Johnson |
| 6,539,175 B1 | 3/2003 | Geary et al. |
| 8,934,011 B1 | 1/2015 | Soler |
| 9,738,156 B2 * | 8/2017 | Plante ................... G07C 5/008 |
| 2003/0133016 A1 | 7/2003 | Chan |
| 2007/0103559 A1 | 5/2007 | Williams |
| 2007/0135980 A1 | 6/2007 | Plante |
| 2007/0153085 A1 | 7/2007 | Chang |
| 2008/0204556 A1 | 8/2008 | de Miranda |
| 2010/0194884 A1 * | 8/2010 | Plaster ................. B60R 25/305 348/148 |
| 2018/0072270 A1 | 3/2018 | Renaud |
| 2019/0111835 A1 * | 4/2019 | Remberg Bueno ...... B60Q 1/48 |

* cited by examiner

*Primary Examiner* — Christopher G Findley
(74) *Attorney, Agent, or Firm* — Michael Best & Friedrich LLP

(57) ABSTRACT

Incident capture systems and methods for a vehicle. One example system includes a head unit that displays a user interface to view and manage incident images. The system also includes an existing vehicle sensor configured to sense conditions outside of the vehicle, an existing vehicle camera configured to capture conditions outside of the vehicle, and an electronic controller. The electronic controller is configured to detect a change in the conditions outside of the vehicle from the existing sensor; determine a state of the system, wherein the state of the system is one selected from the group consisting of an on state and an off state; and in response to determining an on state, receive at least one image from the existing vehicle camera; and store the at least one image in a stack located in a non-transitory computer-readable storage medium.

14 Claims, 9 Drawing Sheets

INCIDENT CAPTURE SYSTEM FOR PARKED VEHICLES USING AN REAR/MULTI VIEW CAMERA SYSTEM

FIELD

Embodiments relate to incident capturing systems using existing sensors and cameras for detecting damage to unattended vehicles.

BACKGROUND

Modern vehicles include various cameras and sensors. For example, modern vehicles often include a rear view camera (RVC) system, a lane keep assistance system, a blind spot warning system, and the like. These systems have sensors that are capable of capturing information regarding the surroundings of a vehicle. Vehicle damage and theft occur, often when a vehicle is parked. While specialized vehicle theft deterrent systems and car alarms are known, mechanisms for recording activity related to theft and damage are either not available or implemented using sensors, for example, cameras, that are added as accessories to a vehicle and used for the single purpose of security.

SUMMARY

Embodiments described herein provide, among other things, a system and a method for capturing incidents that are indicative of damage or theft or a parked car.

One embodiment provides an incident capture system for a vehicle. The system includes a head unit that displays a user interface to view and manage incident images. The system also includes an existing vehicle sensor configured to sense conditions outside of the vehicle, an existing vehicle camera configured to capture conditions outside of the vehicle, and an electronic controller connected to the head unit, the sensor, and the camera. The electronic controller is configured to detect a change in the conditions outside of the vehicle from the existing sensor; determine a state of the system, wherein the state of the system is one selected from the group consisting of an on state and an off state; and in response to determining an on state, receive at least one image from the existing vehicle camera; and store the at least one image in a stack located in a non-transitory computer-readable storage medium.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more communication interfaces, one or more application specific integrated circuits (ASICs), and various connections (for example, a system bus or one or more networks) connecting the various components.

Figure 1:
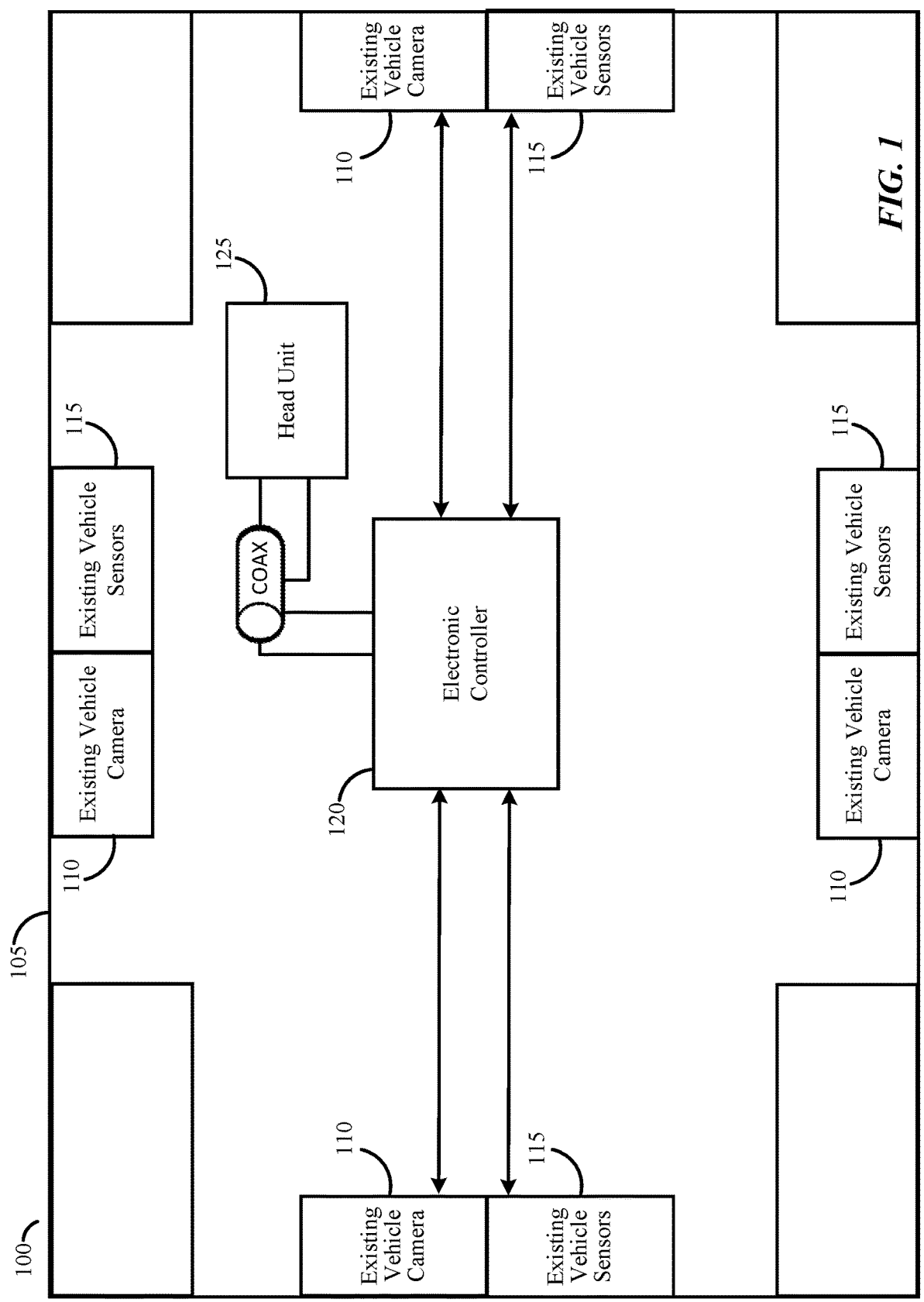
FIG. 1 is a block diagram of a system for capturing incidents using existing vehicle cameras and existing vehicle sensors according to one embodiment.

FIG. 1 illustrates an incident capture system 100 for capturing images for vehicle incidents using existing cameras and sensors. The system 100 includes a vehicle 105. The vehicle 105, although illustrated as a four-wheeled vehicle, may encompass various types and designs of vehicles. For example, the vehicle 105 may be an automobile, a motorcycle, a truck, a bus, a semi-tractor, and others. In the example illustrated, the vehicle 105 includes several hardware components including existing vehicle cameras 110, existing sensors 115 (for example, ultrasonic sensors, infrared sensors, light detection and ranging (LIDAR) sensors, etc.), an electronic controller 120, and a unified hardware interface (also known as a "head unit") 125. The electronic controller 120 is communicatively connected to the existing vehicle cameras 110, the existing vehicle sensors 115, and the head unit 125 using one or more of the various connections described below.

In the embodiment shown, there is one-to-one relationship between each existing vehicle sensor and each existing vehicle camera in accordance with directional coverage. However, in other embodiments there are one or more sensors for each camera. The existing vehicle cameras 110, existing vehicle sensors 115, electronic controller 120, and head unit 125 are described in further detail below.

The existing vehicle cameras 110 are configured to capture images of conditions outside of the vehicle. The existing vehicle cameras 110 provide data to the electronic controller 120 of the system 100 via one or more communication links and, in one example, via a coaxial cable. The embodiment provides but one example of the cameras and connections of the vehicle 105. However, these components and connections may be constructed in other ways than those illustrated and described. For example, various components may be connected via direct connections or via a vehicle network or bus (for example, a controller area network (CAN) bus) and connections may be wired or wireless.

Like the existing vehicle cameras 110, the existing vehicle sensors 115 are configured to sense conditions outside of the vehicle. The existing vehicle sensors 115 provide data to one or more of the components of the system 100 via one or more communication links and, in one example, via discrete or analog input. As noted, various connections may be used and the illustrated embodiment provides but one example of the sensors and connections of the vehicle 105.

Figure 2:
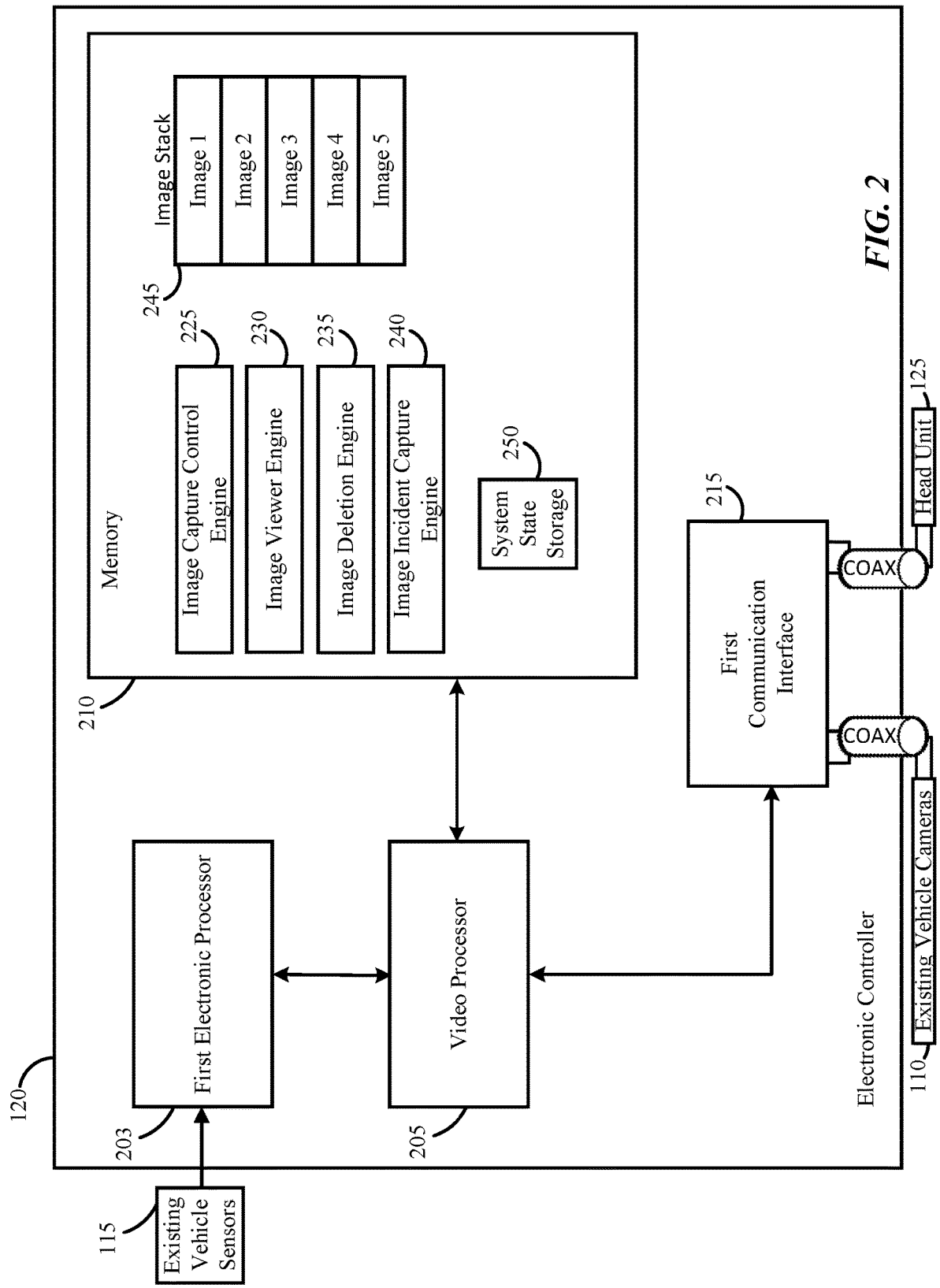
FIG. 2 is a block diagram of an electronic controller of the system of FIG. 1 according to one embodiment.

FIG. 2 is a block diagram of the electronic controller 120 of the system of FIG. 1. The electronic controller 120 includes a plurality of electrical and electronic components that provide power, operation control, and protection to the components and modules within the electronic controller 120. The electronic controller 120 includes, among other things, a first electronic processor 203 (such as a programmable electronic microprocessor, microcontroller, or similar device), a video processor 205, and a memory 210. The memory 210 is, for example, a non-transitory, machine readable memory. In some instances, the image data in the memory 210 is configured as a circular buffer. The electronic controller also includes a first communication interface 215. The first electronic processor 203 is communicatively connected to the existing vehicle sensors 115, and the video processor 205. The video processor 205 is communicatively connected to the memory 210, and the first communication interface 215. The memory 210 includes an image capture control engine 225 (for example, software or a set of computer-readable instructions that changes a system state), an image viewer engine 230 (for example, software or a set of computer-readable instructions that retrieves incident images), an image deletion engine 235 (for example, software or a set of computer-readable instructions that deletes incident images), and an image incident capture engine 240 (for example, software or a set of computer-readable instructions that captures incident images).

The memory 210 also includes an image stack 245, for example, a block of non-transitory, machine readable memory that includes images. In the example shown, the image stack 245 includes five images (Image 1, Image 2, Image 3, Image 4, and Image 5. The memory 210 also includes a system state storage 250, for example, a block of non-transitory, machine readable memory containing an on state or an off state for the incident capturing system. The first electronic processor 203, and the video processor 205, in coordination with software stored in the memory 210 (for example, the software described above), and the first communication interface 215 are configured to implement, by, for example, executing the software stored in the memory, one or more the methods described herein. In some embodiments, the image stack 245 may be located within the memory 210 located in the electronic controller 120. However, in other embodiments, the memory 210 may be located external to the electronic controller 120. In the examples described below, certain methods are carried out by the video processor 205. As noted, however, in some embodiments, the first electronic processor 203 and the video processor 205 work in conjunction with each other to carry out the described methods.

The electronic controller 120 may be implemented in several independent controllers (for example, programmable electronic controllers, including, for example, the video processor 205) each configured to perform specific functions or sub-functions. Additionally, the electronic controller 120 may contain sub-modules that include additional electronic processors, memory, or application specific integrated circuits (ASICs) for handling communication functions, processing of signals, and application of the methods listed below. In other embodiments, the electronic controller 120 includes additional, fewer, or different components.

Figure 3:
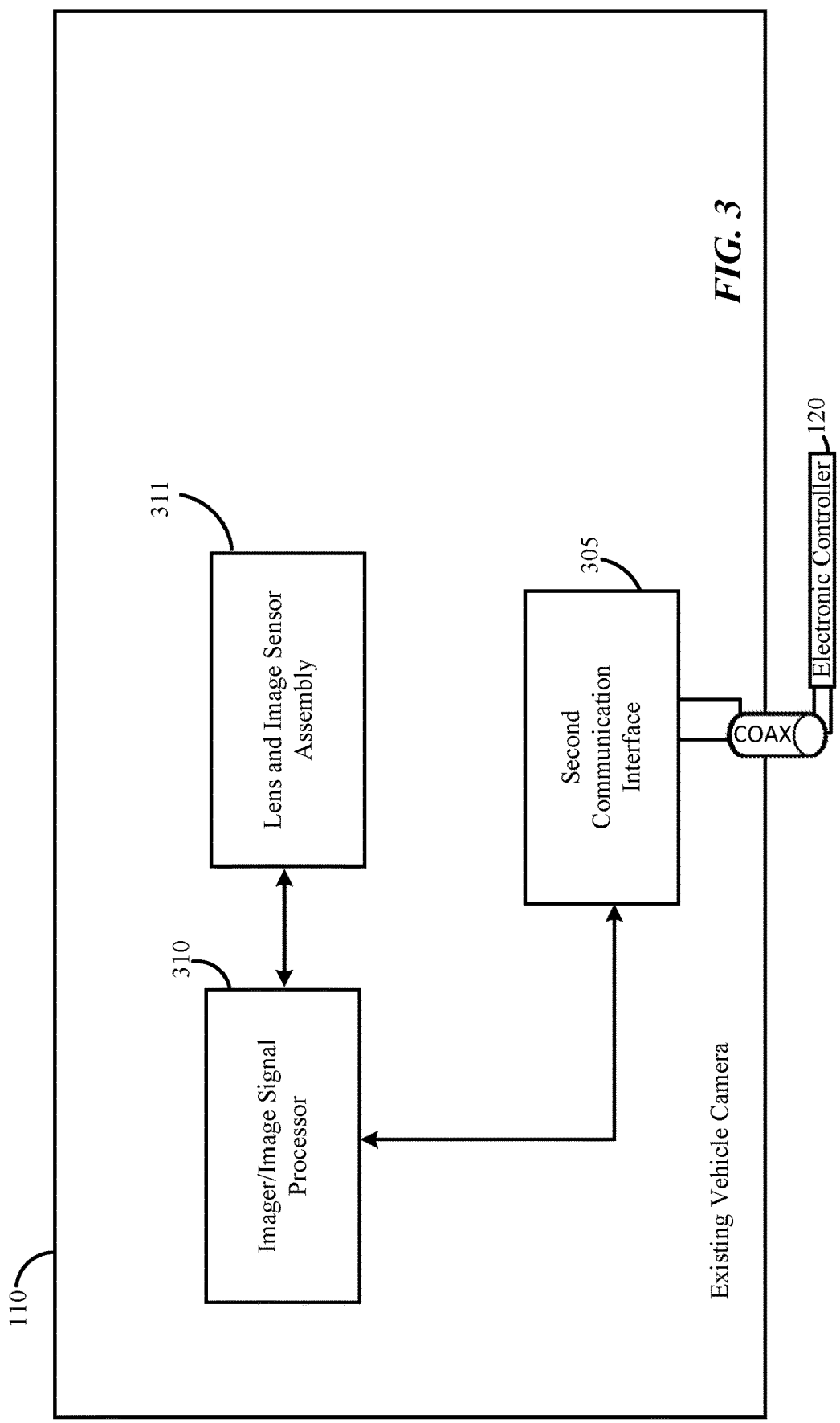
FIG. 3 is a block diagram of an existing vehicle camera of the system of FIG. 1 according to one embodiment.

FIG. 3 is a block diagram of the existing vehicle camera 110 of the vehicle 105. The existing vehicle camera 110 includes, among other things, a second communication interface 305 and an image signal processor 310, and a lens and image sensor assembly 311. In many passenger vehicles, cameras used in existing rear view systems are always turned on. This is true even when a vehicle is turned off. This is possible because such cameras use relatively low amounts of power. Even though such cameras are turned on, images from the camera are not, in general, stored or otherwise utilized. In some embodiments, cameras used in the system 100 remain active or turned at all times. However, in other embodiments cameras used in the system 100 are activated and deactivated based on predetermined conditions. For example, upon an incident being detected by the existing vehicle sensors 115, the camera activates and provides images to the electronic controller 120.

Figure 4:
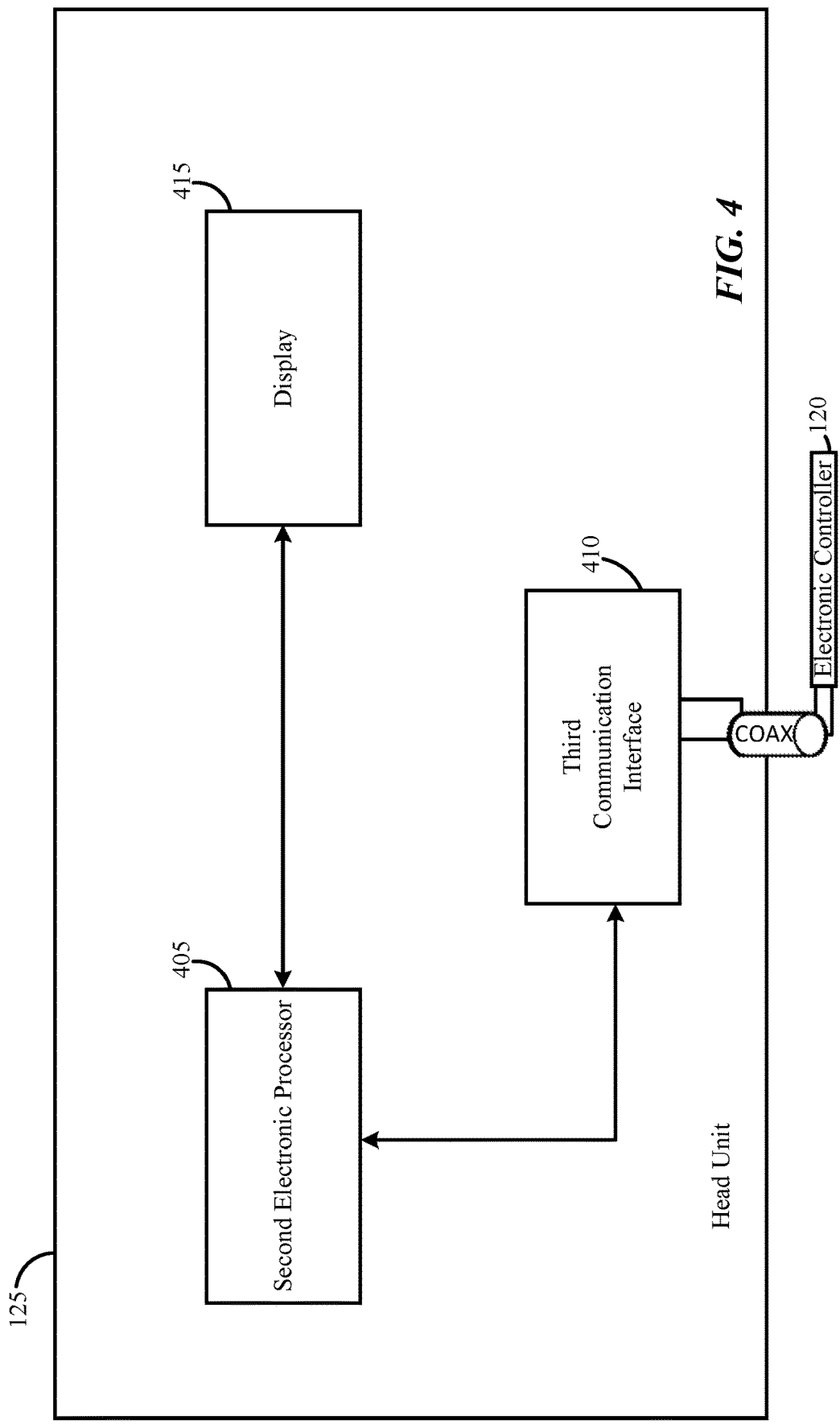
FIG. 4 is a block diagram of a head unit of the system of FIG. 1 according to one embodiment.

FIG. 4 is a block diagram of the head unit 125 of the vehicle 105. In the embodiment shown, the head unit 125 is an interface configured to receive user input, for example, via various buttons. The head unit 125 may send and receive data to and from the electronic controller 120 in response to user input. The electronic controller 120 may also send and receive information and data to and from other sources, for example, one or more of the existing vehicle cameras 110, via one or more communication links and, in one example, via a coaxial cable. In one instance, the head unit 125 is configured generate a graphical user interface (GUI) for display on a display (described below) that is visible to the user or occupant.

Figure 5:
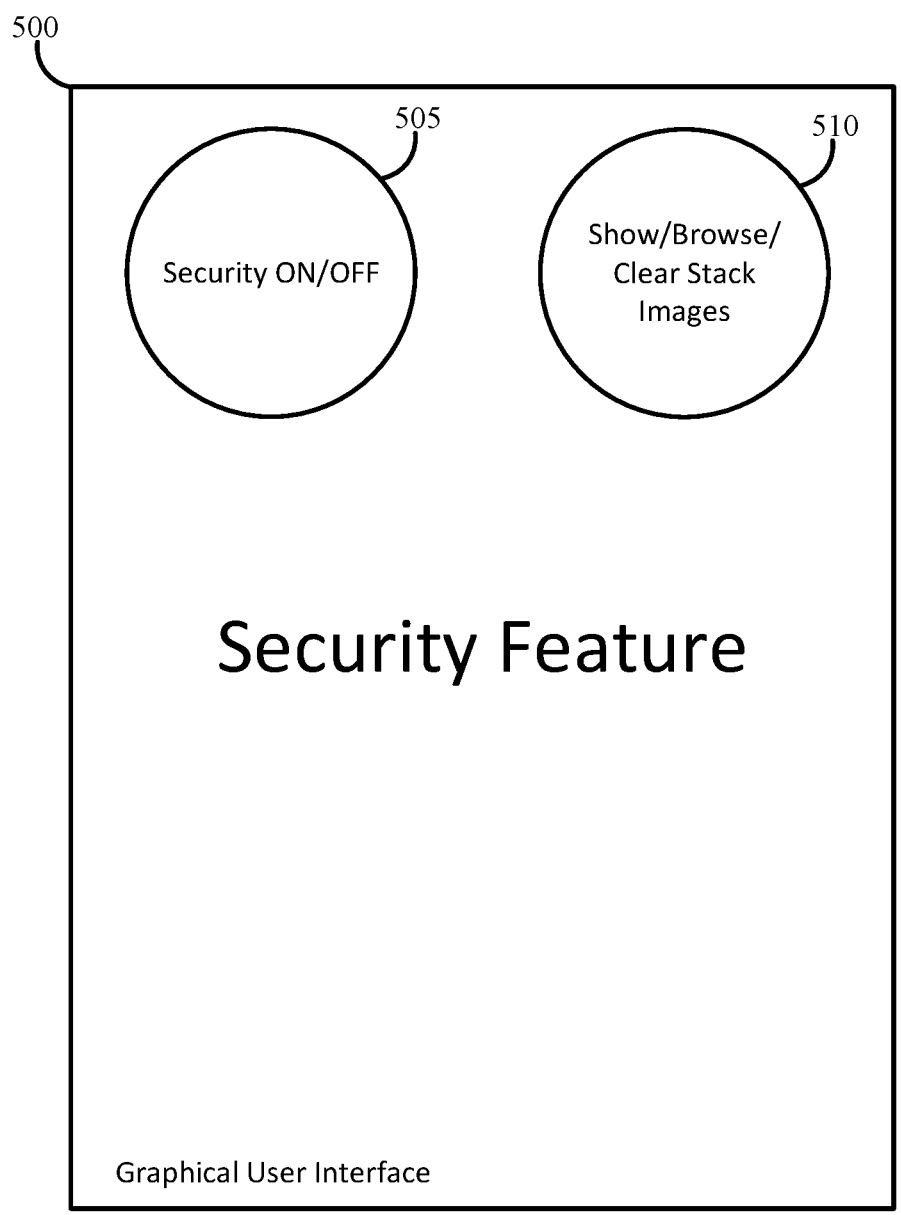
FIG. 5 is an illustration of a graphical user interface containing user selectable options to request data according to one embodiment.

In the example shown, the head unit 125 includes, among other things, a second electronic processor 405, a third communication interface 410, and a display 415. The electronic controller 120 is communicatively connected to the third communication interface 410. As noted, a graphical user interface (GUI) (for example, as shown in FIG. 5) may be generated and then displayed on the display 415 of the head unit 125. The GUI presents various outputs in a manner that is visible to a driver or occupant of a vehicle (sometimes referred to as a "user"). The GUI also provides a mechanism to receive input from a driver or occupant (sometimes referred to as "user requests"). Inputs may be received, provided to the second electronic processor 405, processed as necessary, and ultimately provided to various components of the system 100. In one embodiment, the display 415 may include a touch screen. When so configured or configured with other features and components that provide similar functionality, the head unit 124 may display incident images captured by the existing vehicle cameras on a screen and include selection mechanisms in the GUI designed to receive selections that result in one or more user requests for data from the electronic controller 120 or other components. As is explained in greater detail, in one example, a user interacts with the user interface to turn the incident capture system 100 on and off, and to view and manage incident images.

FIG. 5 illustrates an example graphical user interface 500 generated by the head unit 125 for display on the display 415. In the example shown, the graphical user interface 500 includes a "Security ON/OFF" button 505 and a "Show/Browse/Clear Stack Images" button 510. The buttons 505 and 510 are examples of GUI components through which selections may be received. While buttons are used in the example provided, other GUI selection mechanisms may be used. As its name implies, the "Security ON/OFF button" 505 provides a mechanism to turn the incident capture system 100 on or off or, more broadly, enable or disable image capture. Selection of the "Security ON/OFF button" 505 causes an enable or disable command (depending on whether on or off is selected) to be sent to the image capture control engine 225. Selection of the "Show/Browse/Clear Stack Images" button 510 causes additional components of the graphical user interface 500 to be displayed, for example, additional windows and selection mechanisms (not shown) and causes commands to be sent to the image viewer engine 230 and image deletion engine 235, as the case may be depending on the selections received. In response to the commands, images captured by the one or more existing vehicle cameras 110 are displayed on the display, or deleted from the memory 210.

Figure 6:
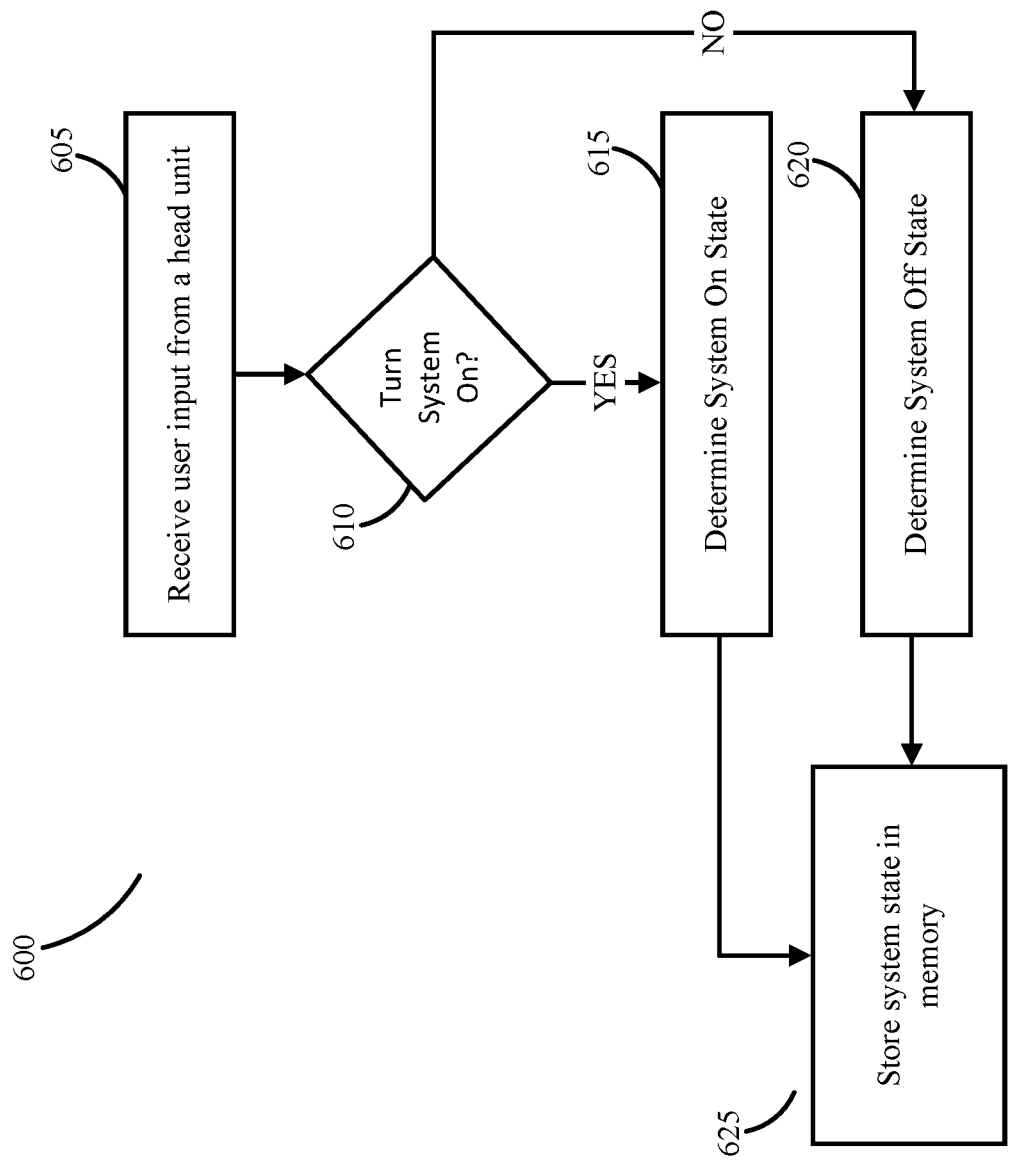
FIG. 6 is a flowchart of a method of using an image capture control engine of the electronic controller of FIG. 2 to receive user input from a head unit and to determine and store a system state according to one embodiment.

FIG. 6 illustrates an example method 600 of the image capture control engine 225. The image capture control engine 225 controls overall activity of the system 100. At block 605, the video processor 205 receives a user request to turn the incident capture system on or off (switch a current system state) from the head unit 125. In the example, shown, the user request is generated as a result of selecting the "Security ON/OFF button" 505. The video processor 205 determines an updated system state (an on state or an off state) based on the user request from the graphical user interface 500 (block 610). If the user request received indicates that the system 100 should be turned on, the video processor 205 sets the system state to on (block 615). If the user request received indicates that the system 100 should be turned off, the video processor 205 sets the system state to off (block 620). The video processor 205 then stores the system state in memory (block 625).

While user input may be used to control whether the system 100 is on or off, in other embodiments, the system is controlled via other input. In one embodiment, the current system state is set to the on state when the video processor 205 determines (for example, by reading data from a CAN bus) that a transmission of the vehicle 105 is in a parking gear (or, more broadly, that the vehicle 105 is parked). The current system state is changed to the off state when the video processor 205 determines that the transmission of the vehicle 105 not in the parking gear. In another embodiment, the system state is set to the on state when the video processor 205 determines that the vehicle is in the parking gear and the user request indicates that the current system 100 should be turned on. Regardless of how the system state is determined, once it is determined, the image capture control engine 225 stores the system state in the system state storage 250 in memory 210 (block 625).

Figure 7:
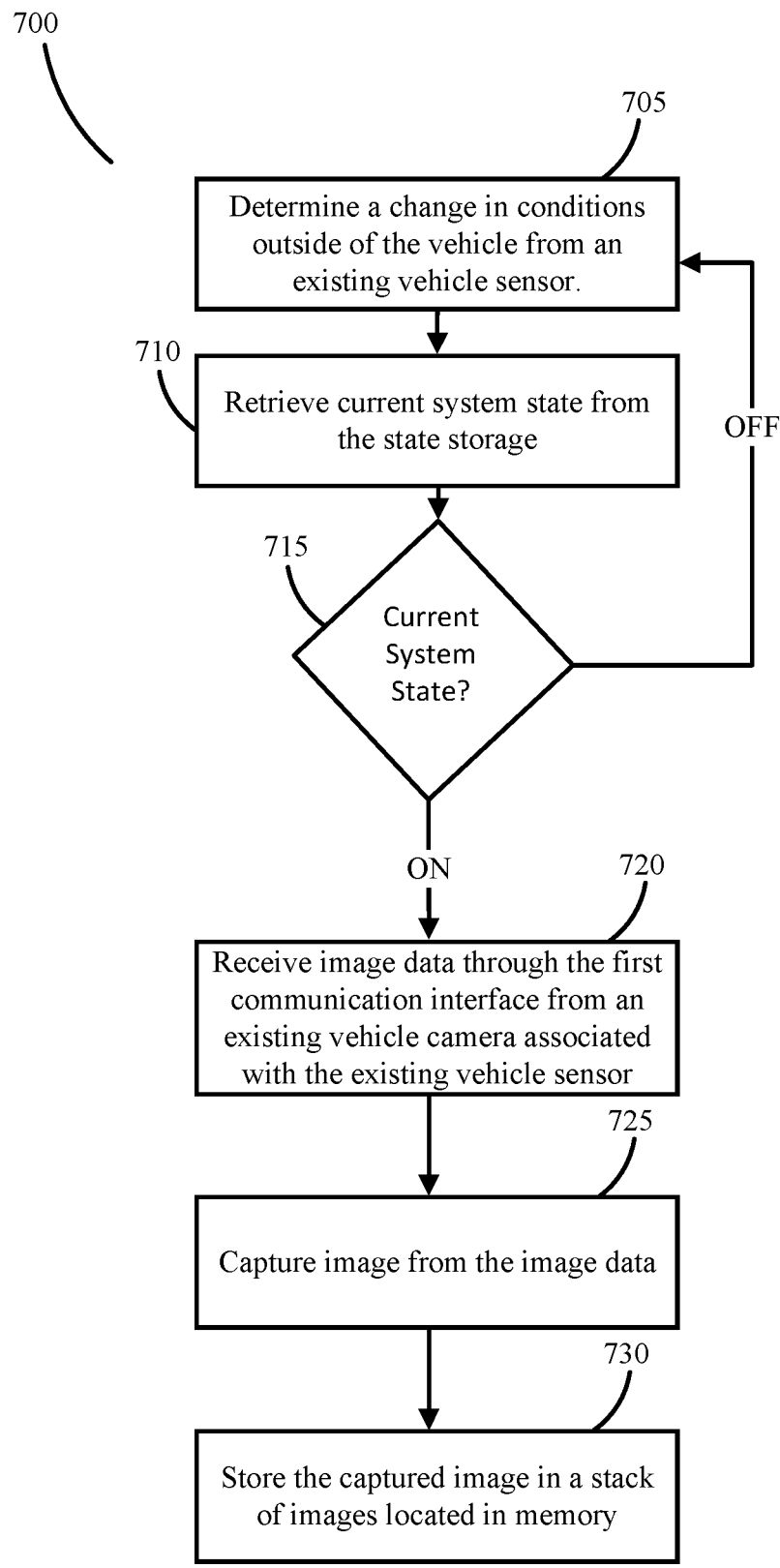
FIG. 7 is a flowchart of a method of using an image incident capture engine of the electronic controller of FIG. 2 to capture images of a change in the conditions outside of the vehicle according to one embodiment.

When the system 100 is turned on, images are captured by the methods of the image incident capture engine 240. FIG. 7 illustrates an example method 700 of the image incident capture engine 240. While it is theoretically possible to activate the existing vehicle cameras at all times and record all images in memory, doing so is not practical particularly in systems whose primary purpose is not security. Memory in most RVC systems is limited and, as a consequence, storing large amounts of images is not possible. For example and as noted above, in some embodiments the memory 210 is a circular buffer. Thus, when the memory 210 is full, the video processor 205 overwrites images in the image stack 245 and previous images are lost. In addition, reviewing voluminous amounts of images to find video that captures impact with another object or activity indicative of a potential theft is also impractical. Thus, determining when and what images to store in memory is beneficial. More specifically, it is beneficial to capture images that are likely to contain impact and theft incidents. To capture such video, existing vehicle sensors 115 are used to detect phenomena that is indicative of impact and/or theft.

At block 705, the first electronic processor 203 determines a change in the conditions outside of the vehicle identified by the existing vehicle sensors 115. In one embodiment, the change in the conditions outside of the vehicle 105 includes an initial detection of an object by the existing vehicle sensor 115 (for example, an ultrasonic sensor or infrared sensor). In such embodiments, an initial detection of an object occurs when an object is sensed within a predetermined, threshold distance from the vehicle 105. In one instance, a threshold distance of 2 centimeters is used. Other threshold may be used, but generally the thresholds are indicative of activity that occurs within about 2 to about 10 centimeters.

In another example, the change in conditions outside the vehicle takes into account both an initial detection of an object and a loss of detection of the object. For example, an object that strikes a parked vehicle will first move toward the vehicle, pass a threshold distance of presence detection, strike the vehicle, and, in many, instances reverse direction and pass outside the threshold distance of detection. In such embodiments, the existing vehicle sensor 115 initially detects the object and continues to detect the presence of the object so long as the object is within the predetermined distance. However, if the object moves away from the vehicle past the predetermined distance, the existing vehicle sensor 115 no longer detects the object. When this second event occurs, a change in the conditions has occurred. In other embodiments, only the loss of detection of an object is utilized as a change in conditions outside the vehicle.

Regardless of how the change in conditions is determined, after the video processor 205 determines the change in conditions, the video processor 205 retrieves the current system state from the system state storage 250 in memory 210 (block 710). At block 715, the video processor 205 determines if the current system state on or off. If the video processor 205 determines that the current system state is off, then the method will continue to try to determine a change in conditions outside of the vehicle (block 705). If the video processor 205 determines that the current system state is on, then the video processor 205 receives image data through the first communication interface 215 from the existing vehicle camera 110 associated with the existing vehicle sensors 115 (block 720). In one embodiment, one image is taken from the image data from the existing vehicle camera 110 (block 725). In another embodiment, a series of images or a small video clip may be stored for the detection of a change in the conditions outside of the vehicle 105. At block 730, the video processor 205 stores the captured image in the image stack 245 in memory 210. Thus, in this way images that are likely to include incidents indicative of impact or theft are captured and stored and less relevant images are not captured.

Figure 8:
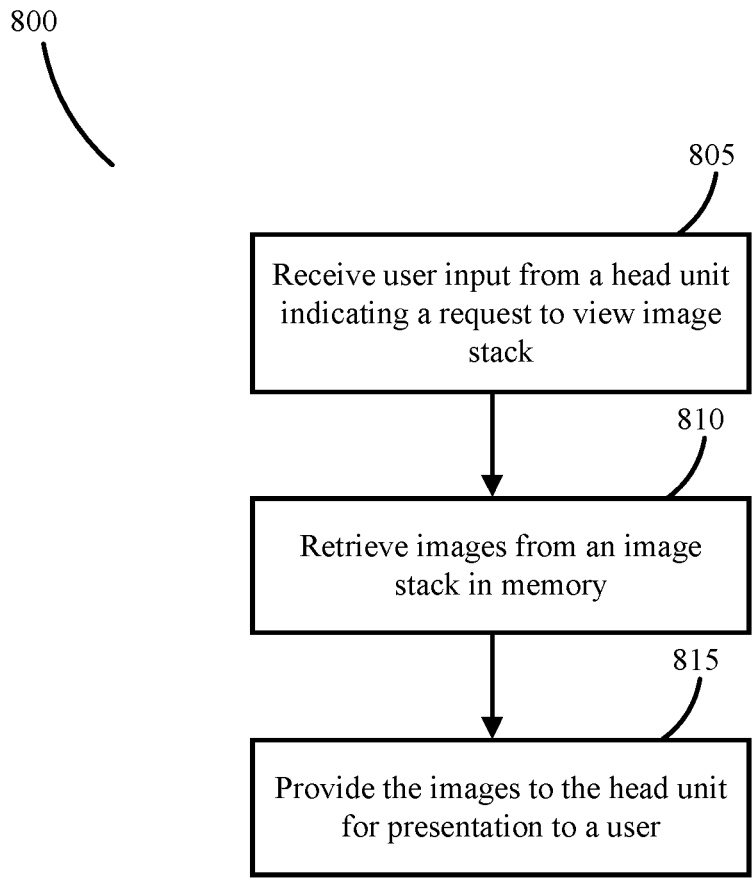
FIG. 8 is a flowchart of a method of using an image viewer engine of the electronic controller of FIG. 2 to receive user input from a head unit and to retrieve images from memory and provide the images to the head unit according to one embodiment.

Once relevant images are captured and stored a used may wish to view the relevant images. FIG. 8 illustrates an example method 800 of the image viewer engine 230. At block 805, the video processor 205 receives a selection from the GUI (as noted above) to view images (block 805). At block 810, the video processor 205 retrieves images from the image stack 245 in memory 210. At block 815, the video processor 205 provides the images to the head unit 125 through the first communication interface 215.

Figure 9:
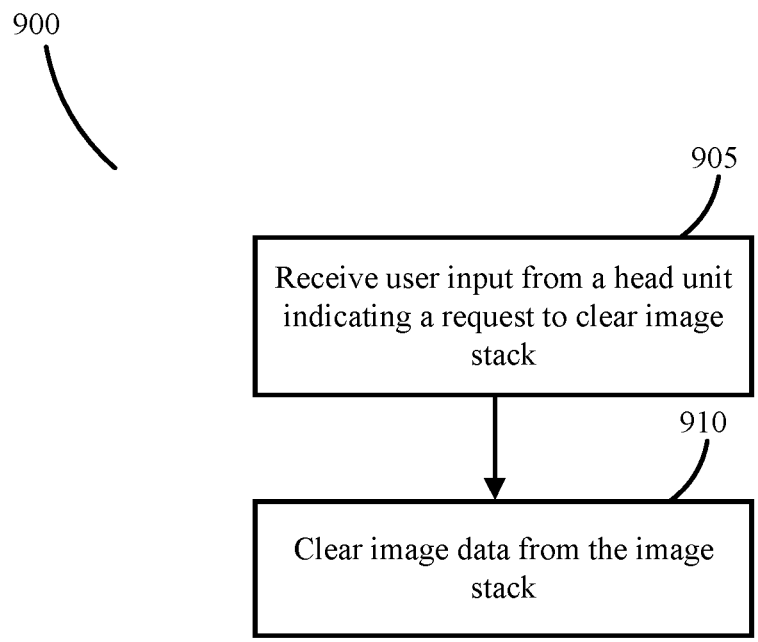
FIG. 9 is a flowchart of a method of using an image viewer engine of the electronic controller of FIG. 2 to receive user input from a head unit and to clear image data from memory.

FIG. 9 illustrates an example method 900 of the image deletion engine 235. While a user may wish to view images of incidents, a user may also wish to delete images, for example, after reviewing relevant images and transferring then to another media or after determining that recorded images do not include significant incidents (for example, minor damage). At block 905 the video processor 205 receives a selection from the GUI (as noted above) to delete images. In the example provided, the first electronic processor 203 clears the image data in the image stack 245 (block 910). However, in other embodiments a subset of image data in the image stack 245 is cleared at block 910.

While a particular order of steps is indicated in the methods illustrated in FIGS. 6-9, the timing, sequence, and inclusion of steps may vary where appropriate without negating the purpose and advantages of the examples provided.

Thus, the embodiments described herein provide, among other things, a system and a method for capturing an incident using existing vehicle sensors and existing vehicle cameras. Various features and advantages of the embodiments are set forth in the following claims.

What is claimed is:

1. An incident capture system for a vehicle, the system comprising:
   a head unit that displays a user interface;
   an existing vehicle sensor configured to sense conditions outside of the vehicle;
   an existing vehicle camera configured to capture conditions outside of the vehicle;
   an electronic controller connected to the head unit, the existing vehicle sensor, and the existing vehicle camera and configured to:
      determine a change in the conditions outside of the vehicle based on information from the existing vehicle sensor, wherein the change in the conditions outside of the vehicle includes both an initial detection of an object and a loss of detection of the object;
      determine a state of the system, wherein the state of the system is one selected from the group consisting of an on state and an off state; and
      in response to detecting the changes in the conditions and determining an on state,
         receive at least one incident image from the existing vehicle camera; and
         store the at least one incident image in a stack located in a non-transitory computer-readable storage medium.

2. The incident capture system according to claim 1, wherein the existing vehicle sensor is one selected from the group consisting of an infrared sensor, an ultrasonic sensor, and a light detection and ranging sensor.

3. The incident capture system according to claim 1, wherein the existing vehicle camera and the existing vehicle sensor are associated by directional coverage.

4. The incident capture system according to claim 1, wherein the existing vehicle camera is configured to always be active.

5. The incident capture system according to claim 1, wherein the on state of the system is determined by one or more selected from the group consisting of a user selection and a determination that the vehicle is parked.

6. The incident capture system according to claim 1, wherein the user interface is configured to manage incident images.

7. The user interface according to claim 6, wherein managing incident images includes deletion, addition, and display of incident images.

8. An incident capture method for a vehicle, the method comprising:
   detecting, with a first electronic processor of an electronic controller, a change in the conditions outside of the vehicle based on information from an existing vehicle sensor, wherein the change in the conditions outside of the vehicle includes both an initial detection of an object and a loss of detection of the object;
   determining, with the first electronic processor, a state of a system, wherein the state of the system is one selected from the group consisting of an on state and an off state; and
   in response to detecting the changes in the conditions and determining an on state,
      receiving, with the first electronic processor, at least one incident image from an existing vehicle camera; and
      storing, with the first electronic processor, the at least one incident image in a stack located in a non-transitory computer-readable storage medium.

9. The incident capture method according to claim 8, wherein the existing vehicle sensor is one selected from the group consisting of an infrared sensor, an ultrasonic sensor, and a light detection and ranging sensor.

10. The incident capture method according to claim 8, wherein the existing vehicle camera and the existing vehicle sensor are associated by directional coverage.

11. The incident capture method according to claim 8, wherein the existing vehicle camera is configured to always be active.

12. The incident capture method according to claim 8, wherein the on state of the system is determined by one or more selected from the group consisting of a user selection and a determination that the vehicle is parked.

13. The incident capture method according to claim 8, wherein a user interface is configured to manage incident images.

14. The user interface according to claim 13, wherein managing incident images includes deletion, addition, and display of incident images.

* * * * *